(12) United States Patent
Erler

(10) Patent No.: US 10,955,673 B2
(45) Date of Patent: Mar. 23, 2021

(54) DEVICES FOR DATA SUPERIMPOSITION

(71) Applicant: Carl Zeiss Jena GmbH, Jena (DE)

(72) Inventor: Christoph Erler, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 145 days.

(21) Appl. No.: 16/318,519

(22) PCT Filed: Jul. 20, 2017

(86) PCT No.: PCT/EP2017/068376
§ 371 (c)(1),
(2) Date: Jan. 17, 2019

(87) PCT Pub. No.: WO2018/015496
PCT Pub. Date: Jan. 25, 2018

(65) Prior Publication Data
US 2019/0243140 A1 Aug. 8, 2019

(30) Foreign Application Priority Data
Jul. 21, 2016 (DE) ...................... 10 2016 113 518.6

(51) Int. Cl.
*G02B 27/01* (2006.01)
*F21V 8/00* (2006.01)
(Continued)

(52) U.S. Cl.
CPC .......... *G02B 27/0172* (2013.01); *G02B 5/02* (2013.01); *G02B 5/0252* (2013.01); *G02B 5/0278* (2013.01); *G02B 6/0016* (2013.01); *G02B 27/0103* (2013.01); *G03H 1/2202* (2013.01); *G02B 2027/0112* (2013.01); *G02B 2027/0174* (2013.01); *G02B 2027/0178* (2013.01); *G03H 2001/2234* (2013.01); *G03H 2223/14* (2013.01); *G03H 2225/31* (2013.01); *G03H 2225/52* (2013.01)

(58) Field of Classification Search
CPC .......... G02B 2027/0105; G02B 6/0016; G02B 27/0172; G02B 27/0103; G02B 5/02; G02B 5/0252; G02B 5/0278; G02B 2027/0112; G02B 2027/0174; G02B 2027/0178; G03H 1/2202; G03H 2001/2234; G03H 2223/14
USPC .......................................................... 359/13
See application file for complete search history.

(56) References Cited

U.S. PATENT DOCUMENTS

| 5,121,229 A | 6/1992 | Benton et al. |
| 2004/0108971 A1* | 6/2004 | Waldern ............... G02B 27/017 345/8 |

(Continued)

FOREIGN PATENT DOCUMENTS

| DE | 102007004444 A1 | 8/2008 |
| DE | 102008039737 A1 | 4/2010 |

(Continued)

*Primary Examiner* — William R Alexander
(74) *Attorney, Agent, or Firm* — Murphy, Bilak & Homiller, PLLC

(57) ABSTRACT

Provided are methods and devices for data superimposition, in which an imaging device comprises a diffuser and a holographic layer to provide a real or virtual image for an observer. In one variant, diffuser and holographic layer are provided on different sides of a transparent carrier. In other embodiments, the imaging device and holographic layer are arranged in smart glasses.

13 Claims, 3 Drawing Sheets

(51) Int. Cl.
*G02B 5/02* (2006.01)
*G03H 1/22* (2006.01)

(56) References Cited

U.S. PATENT DOCUMENTS

| | | |
|---|---|---|
| 2005/0200962 A1 | 9/2005 | Voloschenko et al. |
| 2006/0268421 A1* | 11/2006 | Shimizu .............. G02B 27/0172 359/630 |
| 2008/0186547 A1* | 8/2008 | Shimizu .................. G02B 5/32 359/13 |
| 2010/0027289 A1 | 2/2010 | Aiki et al. |
| 2010/0066926 A1* | 3/2010 | Tanijiri ............... G02F 1/13362 349/11 |
| 2011/0164294 A1 | 7/2011 | Shimizu |
| 2011/0194163 A1* | 8/2011 | Shimizu ............. G02B 27/0172 359/15 |
| 2014/0043320 A1* | 2/2014 | Tosaya ............... G02B 27/0172 345/419 |
| 2015/0160529 A1* | 6/2015 | Popovich ............ G02F 1/13342 359/200.8 |
| 2018/0024361 A1 | 1/2018 | Erler et al. |
| 2018/0045962 A1* | 2/2018 | Inagaki .............. G02B 27/0172 |

FOREIGN PATENT DOCUMENTS

| | | |
|---|---|---|
| DE | 102011083662 A1 | 4/2013 |
| DE | 102015116408 A1 | 3/2017 |
| EP | 1798587 A1 | 6/2007 |

* cited by examiner

DEVICES FOR DATA SUPERIMPOSITION

TECHNICAL FIELD

The present application relates to devices for data superimposition.

BACKGROUND

Devices for data superimposition are increasingly used to provide data to a user in a simple manner. The term "data" should here by understood in general terms. Superimposed data can comprise, for example, images, videos, symbols, characters and/or numbers. Such data are here preferably represented such that a user can perceive both the data and an environment.

An area of use of such devices for data superimposition is the automotive field, for example to provide data to a driver of a vehicle, for example to a driver of a car, during driving. This can be done in particular by way of corresponding elements in a windshield of a vehicle. In this way, the driver has no need to specially aim their gaze onto a display for example of an instrument panel to receive data, but can perceive said data without significantly averting their gaze from the road. Such devices are known for example from DE 10 2008 039 737 A1.

Another area of use is what are known as smart glasses, in which data are superimposed on a spectacle lens. With a transparent spectacle lens, the user is then able to simultaneously perceive the data and their environment.

The devices for data superimposition described in the present application, however, can also be used in other applications, in particular generally in all transparent carriers, for example transparent panes. For example, the devices described can also be used for transparent panes of vehicles other than cars, such as trains, buses, ships or aircraft, but also in the property sector for window panes. Ultimately, the devices described can be used wherever variable contents are to be represented and/or generated. For example, it is possible to use the devices described to make indication elements having illumination functions, such as vehicle tail lights, variable.

In various applications, for example in smart glasses or motorbike helmets, where there is not much space, compact solutions in particular are required. In addition, it is desirable to represent images in a plurality of planes. There is additionally a requirement in smart glasses to connect the superimposition of data with an optical correction function of the spectacle lenses, as in the case of conventional glasses.

SUMMARY

A device for data superimposition is provided, comprising:
a holographic layer arranged on a transparent carrier, and
an imaging device having a diffuser for generating an intermediate image, wherein the diffuser is configured to transmit light in accordance with data to be superimposed to the holographic layer, wherein the holographic layer is configured to generate a real or virtual image which is observable by a user or an image in the plane of the holographic layer (in this case also referred to as "image-plane hologram"), in accordance with the data to be superimposed. It is also possible to generate a plurality of images, with combinations of real images, virtual images and images located in the plane of the holographic layer also being possible here.

By using the holographic layer, the image may be generated in particular at a desired position.

The imaging device may furthermore comprise a light source, an amplitude modulator for modulating light from the light source in accordance with the data to be superimposed, and an imaging optics for imaging light from the amplitude modulator onto the diffuser.

The diffuser may be arranged at an angle between 85° and 95° relative to the holographic layer.

In other embodiments, the diffuser may also be arranged at other angles, e.g., in the angle range 95 to 0°, relative to the holographic layer.

The diffuser can in particular be a holographic diffuser. In this way, light can be directed specifically to the holographic layer.

The holographic layer may be arranged on a first side of the carrier, and the diffuser can be arranged on a second side of the carrier, with the result that light passes from the diffuser through the carrier to the holographic layer. By arranging the diffuser and the holographic element on different sides of the carrier, a compact construction is possible.

The light from the diffuser here passes preferably only through the carrier to the holographic layer.

In an embodiment, the device is embodied in the form of smart glasses, wherein the carrier is a spectacle lens of the smart glasses, and wherein the imaging device is arranged in a side piece of the smart glasses.

In this way, compact data superimposition onto spectacles may be achieved. By using a holographic element, this can be combined in particular with arched or curved panes, in particular optically correcting spectacle lenses.

The diffuser may exhibit a dimension of less than 1.5 cm·1.5 cm, preferably less than 1.0 cm·1.0 cm, which means it is able to be accommodated easily in the side piece.

The device may be configured for representing polychromatic images.

The image may comprise a first image at a first position and a second image at a second position.

The holographic layer may herefor be configured to generate the first image based on a first group of wavelengths and to generate the second image based on a second group of wavelengths.

Alternatively, the imaging device may herefor comprise a first imaging device and a second imaging device, with the diffuser comprising a first diffuser of the first imaging device and a second diffuser of the second imaging device, with the first diffuser being arranged at a different position than the second diffuser, with the holographic layer being configured to generate the first image based on light from the first diffuser and to generate the second image based on light from the second diffuser.

With such measures, the representation in multiple image planes is possible.

BRIEF DESCRIPTION OF THE DRAWINGS

Embodiments are explained in more detail below on the basis of embodiments. In the figures.

DETAILED DESCRIPTION

Various embodiments are explained in detail below. These embodiments serve merely for illustration and should not be interpreted as limiting. In particular, a description of an embodiment having a large number of details and features should not be interpreted to mean that all these details and features are necessary for implementation. Rather, some of the illustrated features or details can also be omitted or be replaced by alternative features or details. In addition to the explicitly described and represented features, further features, components etc. which are conventionally used in devices for data superimposition can be provided.

Devices for data superimposition in the text below are understood to mean devices that provide data to an observer, in particular using transparent carriers to simultaneously permit a user a view of an environment. Such devices for data superimposition can be used in particular as head-up displays in vehicles or in smart glasses, but are not limited hereto.

Figure 1A:
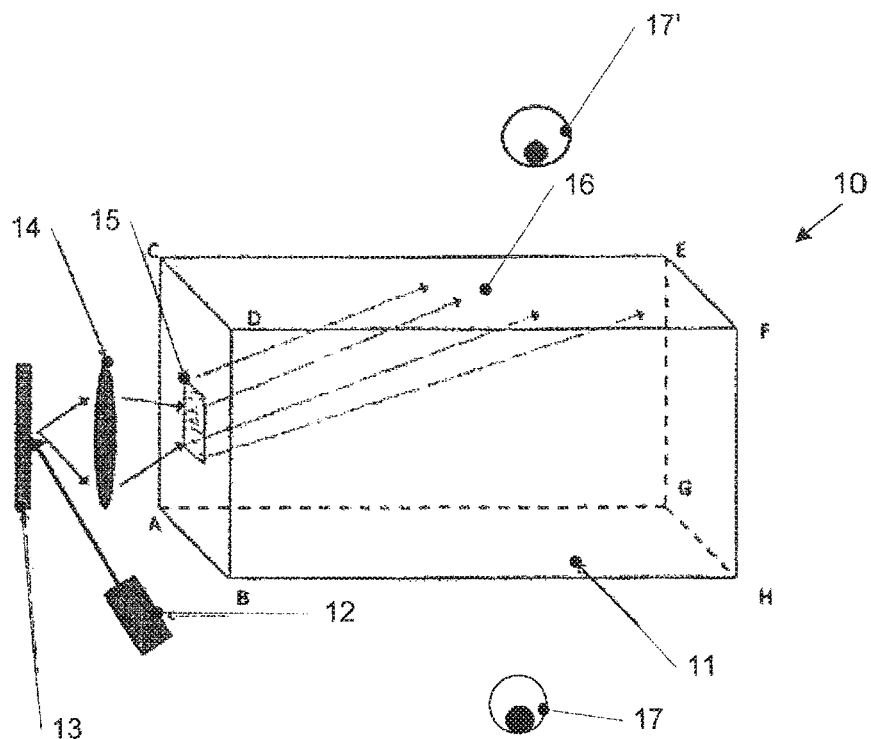
FIG. 1A shows a perspective view of a device for data superimposition in accordance with an embodiment.
Figure 1B:
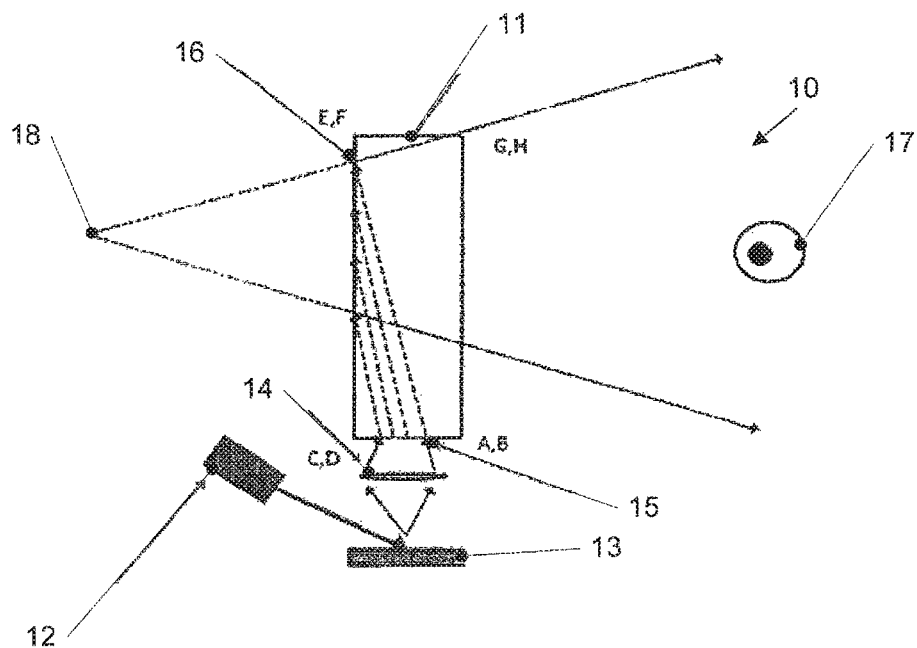
FIG. 1B shows a plan view of the device of FIG. 1A.

FIG. 1 shows a device for data superimposition in accordance with an embodiment, with FIG. 1A showing a perspective view of the device 10 and FIG. 1B showing a plan view of the device 10.

The device of FIG. 1 comprises a light source 12 for generating a light beam. The light source 12 can be a monochromatic light source. However, the light source 12 is preferably a multicolored light source, for example a module having at least one red, one green and one blue laser (RGB laser module) or a module having red, green and blue light-emitting diodes (RGB LED module). Light from the light source 12 is incident on a spatial amplitude modulator 13 for modulating the light spatially with respect to the intensity in accordance with data that are to be set. An amplitude modulator 13 that can be used herefor is a micromirror arrangement (DMD, "digital micromirror device") or a liquid-crystal arrangement (e.g., LCoS, "liquid crystal on silicon"). In particular, the amplitude modulator 13 in the embodiment shown is scanned using one or more light beams from the light source 12. The amplitude modulator 13 can be controlled by a controller (not illustrated) in accordance with the data that are to be superimposed.

The light that is modulated spatially and temporally in this way by the amplitude modulator 13 is imaged by an imaging optics 14 onto a diffuser 15. An intermediate image is generated by way of the diffuser 15. While the imaging optics 14 in FIG. 1 is schematically illustrated in the form of a simple lens element, the imaging optics 14 may comprise any combination of one or more lens elements, one or more mirrors, one or more diffractive elements, or other suitable optical elements for imaging the light from the amplitude modulator 13 onto the diffuser 15. The arrangement of light source 12, amplitude modulator 13, imaging optics 14 and diffuser 15 is also referred to, within the context of the present application, as an imaging device. The intermediate image is generated on the diffuser 15, and the angular spectrum of light coming from the diffuser 15 contains image information.

The diffuser 15 can in some embodiments be a simple focusing screen. The diffuser is preferably embodied such that it has a desired scattering characteristic such that light is transmitted in a targeted manner in accordance with the intermediate image. In particular, a holographic focusing screen can be used, as is described in German patent application 10 2015 116 408.6. A holographic focusing screen of this type can have in particular a holographic structure which is embodied such that different wavelengths generated by the light source 12 (e.g., a red, a green, and a blue wavelength) are scattered at the same scattering angles. To this end, the diffuser 15 can comprise for the different wavelengths different holograms which are designed in each case for the same scattering angles but different wavelengths. A diffuser of this type can be used to avoid in particular color fringes.

In the embodiment of FIG. 1, the diffuser 15 is arranged in a first surface of a transparent carrier 11 defined by corner points A, B, C and D. The carrier 11 can be generated for example from a glass or a transparent plastics material.

In the embodiment of FIG. 1, this light that is scattered by the diffuser 15 is directed to a holographic layer 16, which is arranged at a second side surface having the corner points C, D, E, F of the carrier 11. The scattering characteristic of the diffuser 15 is here preferably such that as much light as possible arrives at the holographic layer 16. Such directed scattering is possible in particular using the abovementioned holographic focusing screen.

The holographic layer 16 in the embodiment of FIG. 1 takes the form of a reflection hologram and images the light from the diffuser 15, as is shown in particular in the plan view of FIG. 1B, onto a virtual image 18 for observation through an eye box 17 of an observer. In other words, the observer can observe the virtual image 18 and in this way perceive the data.

For example, the holographic layer can be implemented as a reflection hologram for three discrete wavelengths in the red, green and blue range according to the wavelengths of the light source 12 so as to generate a polychromatic (i.e., multicolored) virtual image. The distance at which the virtual image 18 is generated from the holographic layer 16 is determined during the manufacture of the holographic layer 16 by way of corresponding light-exposure of a light-sensitive material. The distance can be from a few centimeters to practically infinity. The holographic layer 16 here has the desired optical effect for the wavelengths of the light source 12, i.e., imaging onto the virtual image 18, while it is transparent for other wavelengths. This permits a view through the carrier 11. For example an embedded or laminated holographic film having a photopolymer, in which the corresponding holographic function was created by exposure, can be used as the holographic layer 16. The holographic function can likewise be integrated in a photoreactive glass or in a photorefractive glass layer. Such a photorefractive layer can consist of a thin photorefractive glass film, which may be applied onto a substrate. The use of plastic, e.g., PQ-doped PMMA, is also possible.

In the embodiment shown, the surface on which the diffuser 15 is arranged is substantially perpendicular (e.g., at an angle of between 85 and 95°) to the surface in which the holographic layer 16 is arranged. Such a configuration resembles conventional edge-lit holography, in which a hologram is laterally illuminated to represent image information stored in the hologram (cf. for example U.S. Pat. No. 5,121,229 A). By contrast, the holographic layer 16 here serves for imaging a variable image content which is determined by the amplitude modulator 13. In other embodiments, the diffuser 15 can also be arranged at a different angle relative to the holographic layer, e.g., in an angle region of 95° to 0°. At 0°, the diffuser would be located opposite the holographic layer and parallel therewith. The position for the diffuser would thus be on the surface ABHG rather than ABCD.

In the embodiment of FIG. 1, the diffuser is operated in transmission, i.e., on one side it receives light from the amplitude modulator 13 via the imaging optics 14 and, on the other side, it emits light toward the holographic layer 16. In other embodiments, a diffuser operating in reflection can also be used. In this case, the diffuser is illuminated from the same side to which it also emits the light again toward the holographic layer. In such a case, the diffuser 15 could be arranged for example in the surface having the corner points, E, F, G, H and receive light from the amplitude modulator 13 via the imaging optics 14 through the transparent carrier 11.

In the embodiment of FIG. 1, the holographic layer 16 generates a virtual image 18. In other embodiments, the holographic layer 16 may be configured to generate a real image between the carrier 11 and the eye box 17.

In the embodiment of FIG. 1, the holographic layer 16 is furthermore embodied in the form of a reflection hologram. In other embodiments, a transmission hologram can be used. In this case, the position of the eye box would be designated, e.g., 17' in FIG. 1A.

Consequently, different types of holograms and diffusers can be used to implement devices for data superimposition according to the invention.

Figure 2:
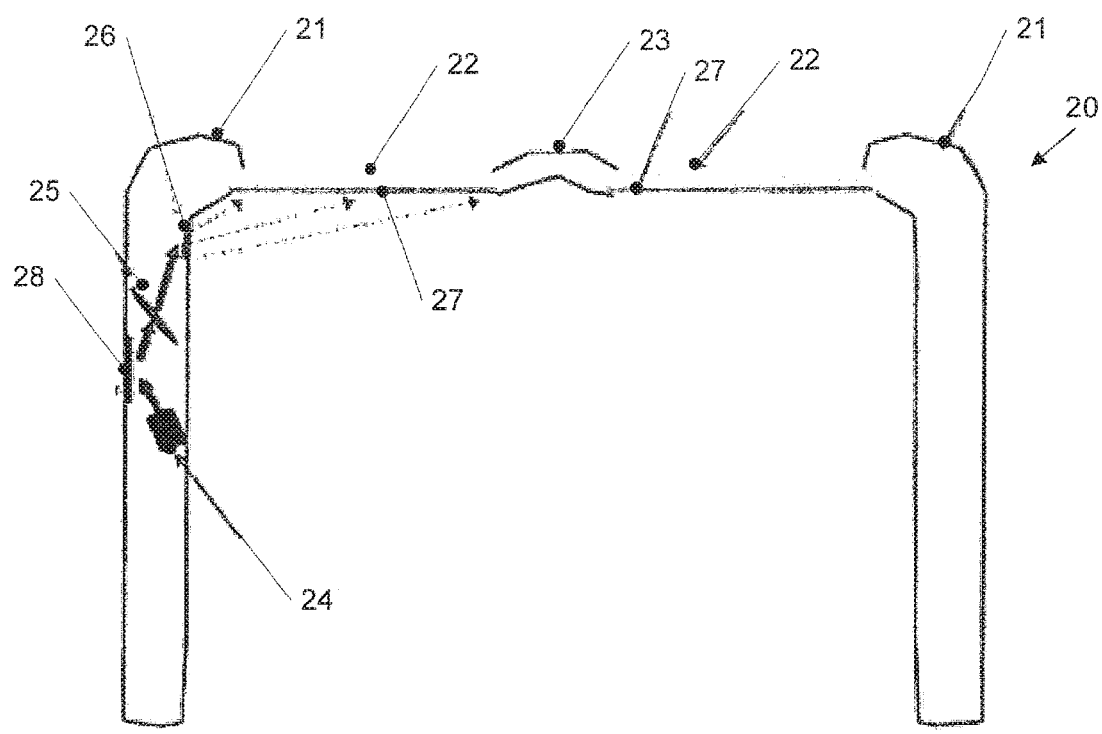
FIG. 2 shows a schematic cross-sectional view of smart glasses in accordance with an embodiment.

FIG. 2 illustrates a cross-sectional view in plan view of a device 20 for data superimposition in accordance with a further embodiment. The embodiment of FIG. 2 here in particular has the form of smart glasses, having side pieces 21, spectacle lenses 22, and a nose bridge 23.

The spectacle lenses 22 may be in particular transparent lenses to permit a wearer of the device 20 a view of the environment. In a preferred embodiment, the spectacle lenses 22 are curved optical lenses that can correct defective vision of the wearer of the device 20.

In addition, the device 20 has a device for data superimposition. The latter will be described below for the spectacle lens 22 illustrated on the left in FIG. 2. A corresponding device can also be provided for the other spectacle lens 22, shown on the right in FIG. 2.

The device 20 of FIG. 2 to this end comprises an imaging device, comprising a light source 24, an amplitude modulator 28, an imaging optics 25, and a diffuser 25 for generating an intermediate image. The imaging device thus formed is here dimensioned such that it can be accommodated in the side piece 21. To this end, for example the diffuser 26 can have dimensions of less than 1.5·1.5 cm, in particular less than 1.0·1.0 cm. This miniaturization aside, the function of the imaging device having the components 24, 28, 25 and 26 corresponds to the imaging device of FIG. 1 having the components 12, 13, 14 and 15, and the details, modifications and possible implementations that were discussed with reference to FIG. 1 for the imaging device present there are also applicable to the imaging device of FIG. 2. For this reason, said details will not be explained again.

Light then passes from the diffuser 26 to a holographic layer 27, which is arranged on a side of the spectacle lens 22 that faces the carrier (in this case the spectacle lens on the left). The diffuser 26 can in particular again be a holographic diffuser, which is configured in a manner such that as much light as possible reaches the holographic layer 27. A corresponding holographic layer 27 is also arranged on the right-hand spectacle lens 22 in FIG. 2 to receive light from a further imaging device (not illustrated), which is arranged in the right-hand side piece 21.

The holographic layer 26 in FIG. 2 can again be designed as described for the holographic layer 16 of FIG. 1 to generate a virtual image for a user of the glasses. In principle, production of a real image between glasses and eye is also possible, wherein this image would be located in this case very close to the eye. The holographic layer 27 in the embodiment of FIG. 2 is designed, like in FIG. 1, in the form of a reflection hologram and the diffuser 26 in the form of a transmission diffuser. The diffuser 26 in the embodiment of FIG. 2 is arranged approximately perpendicularly to the holographic layer 27, for example at an angle between 85 and 95°. The holographic layer 27 can here in particular also be applied, as mentioned, onto curved spectacle lenses 22.

Holographic layers like the holographic layer 16 of FIG. 1 or the holographic layer 27 of FIG. 2 can be generated by way of suitable exposure of a light-sensitive material, for example the abovementioned holographic film having photopolymer. Reproduction is then possible also with optical contact replication.

One example of the production of a reflection hologram that can be used for example for the holographic layer 16 of FIG. 1 or the holographic layer 27 of FIG. 2 will now be explained with reference to FIGS. 3A and 3B.

Figure 3A:
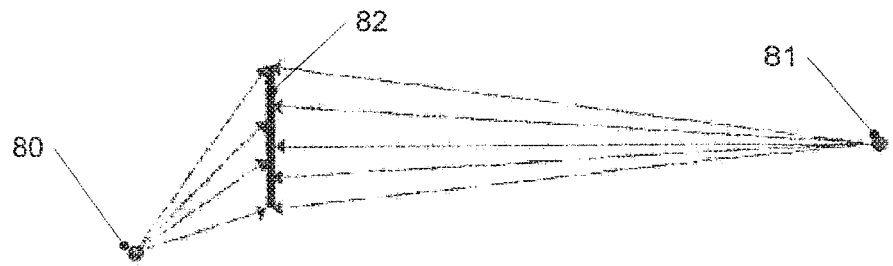
FIGS. 3A and 3B show illustrations for explaining the production of holographic elements for embodiments.

FIG. 3A shows an exposure of a holographic element 82 for data superimposition, which is utilizable for example as the holographic layer 16 of FIG. 1 or as the holographic layer 27 of FIG. 2. In this case, for generating a holographic element 82, interference of two spherical waves traveling in opposite directions is recorded on the holographic element 82, in particular within a light-sensitive holographic layer, which waves can be generated for example using a coherent laser of adequate coherence length. A point light source 80 for emitting one of the spherical waves is situated in this case at the later location of the diffuser 15 or 26 and emits what is known as a reference wave, and a further point light source 81 for emitting the other of the spherical waves is situated at the location of the later virtual image (18 in FIG. 1B) and emits what is known as a signal wave.

By way of the distance between the two point light sources 80, 81 from the holographic element 82, the later distance of the imaging device from the holographic element 82 and the distance of the later represented virtual image is determined. For example, if the point light source 81 is situated at a distance of 8 m from the holographic element 82, then later in the reproduction, the virtual image will likewise be located at a distance of 8 m from the holographic element 82.

The distance of the virtual image from the eye box (i.e., substantially from an eye of an observer) will later correspondingly be at least approximately the sum of the distance of the point light source 80 from the holographic element 82 plus the distance of the point light source 81 from the holographic element 82. It is possible in this way in principle to realize any desired distance of the virtual image during later use.

Figure 3B:
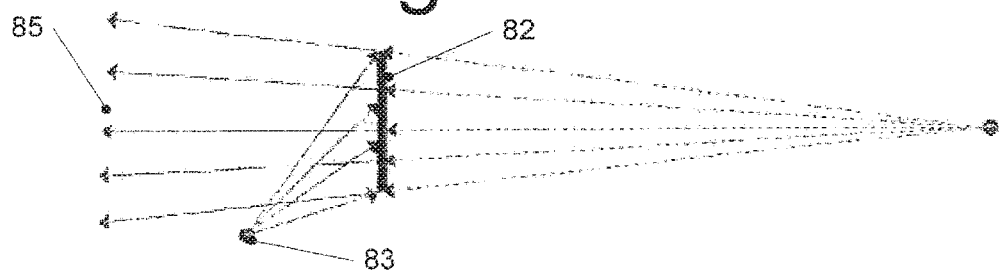

FIG. 3B here shows the application of the holographic element that is exposed as in FIG. 3A in an "ideal case." The holographic element is illuminated, starting from a point light source 83 (corresponding to an imaging device) with reference light, which results in the formation of a virtual image 84 (corresponding to the position of the point light source 81 in FIG. 3A), which can be observed by an eye (eye box) at 85.

In the real application case, rather than using the point light source 83, an imaging device having a diffuser is used, which, in contrast to a point light source, has an extent Δy in the y-direction and an extent Δx in the x-direction. This can result in distortions as compared to the ideal case of FIG. 3B, but for practical applications these are to a certain degree negligible, depending on a desired image quality. With preference, the extent of the diffuser is selected to be relatively small, and the diffuser is arranged near the location of the point light source 80.

For a plurality of colors, it is then possible to stack a plurality of holographic elements 82 one above the other for forming the holographic layer 16 of FIG. 1A or 27 of FIG. 2, one layer for each desired wavelength. As already mentioned, the holograms are both wavelength-selective and angle-selective, which means that they are transparent in particular for wavelengths other than the operating wavelengths of light source 12 or 24.

The wavelength-selectivity and angle-selectivity can also be used to represent contents in a plurality of planes. This will be explained below.

In this case, image representation (virtual and/or real) can be effected, as mentioned, in a plurality of planes, at different angles, and/or generally at different locations. This process takes advantage of the fact that the holographic layers used, in particular volume holograms, operate, as already described, both wavelength-selectively and angle-selectively. Consequently, different colors can be imaged at different locations and/or be observed from different angles by selecting for example the directions and shapes of reference beam and signal beam to be different for different wavelengths when generating the holographic element.

In particular, color images (real or virtual) can be generated at different locations by way of red, green and blue wavelengths, which differ in terms of wavelength by more than a sensitivity region of the respectively used hologram. For example, the operating wavelengths 532 nm (green), 460 nm (blue) and 660 nm (red) can be used for a first image, while the operating wavelengths 520 nm (green), 442 nm (blue) and 647 nm (red) can be used for a second image. By combining corresponding volume holograms, it is possible hereby to generate for example a first virtual image at a first distance from the holographic element, for example 1 m, and to generate a second image at a second distance, for example 1.5 m, with a polychromatic representation, including white, being possible for each of said images. Similar can also be implemented for monochromatic images with in each case only one wavelength. The image generation can be realized with one imaging device, which then generates 6 different colors overall, or alternatively with separate imaging devices, which can also be arranged at different angles. An observer located in the eye box then sees both contents at different distances. In this case, each holographic element only sees "its" operating wavelengths and is otherwise transparent. Combinations with even more wavelengths and different distances are also possible.

Figure 4:
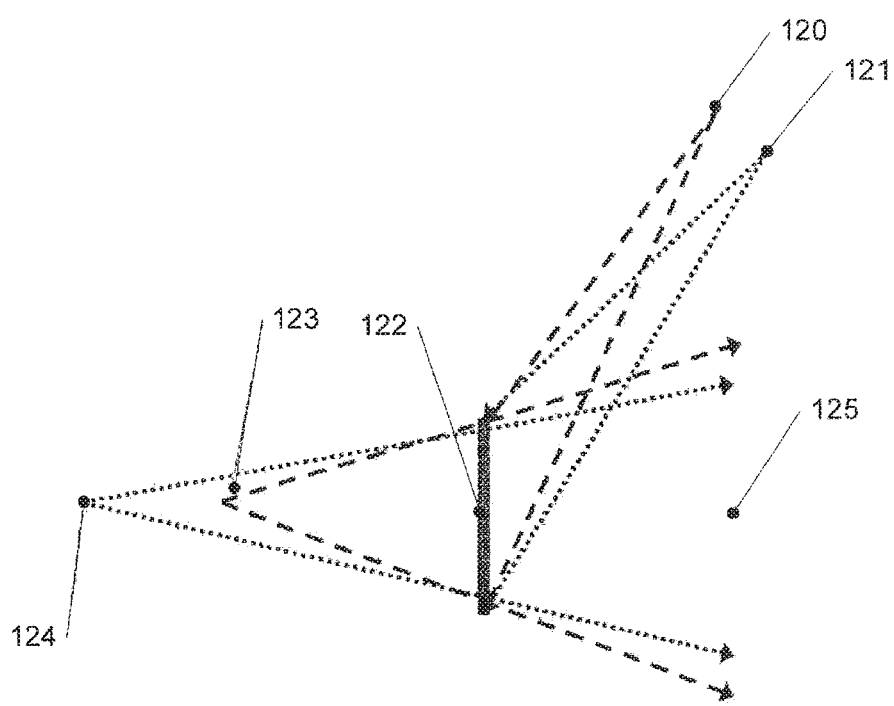
FIG. 4 shows a schematic illustration of a device for data superimposition in accordance with an embodiment.

In embodiments in which the imaging devices are located at different locations, it is also possible to use the same wavelengths for both images, because, as mentioned, the holographic elements are also angle-selective. A corresponding embodiment is illustrated in FIG. 4. In the embodiment of FIG. 4, a holographic element 122 contains volume holograms for two different imaging devices, of which diffusers 120, 121 are illustrated. Based on light from the diffuser 120, a virtual image at a location 123 is generated, and, based on light from the diffuser 121, a virtual image at a location 124 is generated, the latter having a distance from the holographic element 122 which differs from that of the location 123. The two virtual images can then be observed within an eye box 125. The production of the volume holograms by exposure for the two imaging devices 120, 121 can be effected in separate layers and in each case as discussed above.

In the example illustrated in FIG. 4, the virtual images at the locations 123, 124 can be viewed from the same eye box 125, that is to say viewed simultaneously. However, other variations are also possible. For example, the holographic element 122 and the diffusers 120 and 121 may be configured such that the virtual images can be observed "one next to the other," as it were, which can effectively increase the size of the eye box. The refinement may also provide, e.g., when using the embodiment of FIG. 1 in a vehicle, that separate images can be observed from different positions, for example from a driver position and a passenger position in a vehicle. In this way, different contents can be represented for different persons. Overall, it is thus possible to provide different virtual or real images using one or more imaging devices, possibly using different operating wavelengths, at different locations and/or for observation from different locations.

In other embodiments, three-dimensional contents (3D contents) can also be represented.

In some embodiments, similar as stated above, separate virtual or real images are generated to this end for a left and a right eye in correspondingly small eye boxes. If the images are correspondingly selected with different perspectives, a stereo effect can be generated hereby. This is possible in particular in smart glasses like the embodiment of FIG. 2.

In this way, the properties of holographic elements can be used to create a spatial impression. This offers freedoms with respect to the contents represented.

The invention claimed is:
1. An apparatus comprising:
   a transparent carrier arranged for a user of the apparatus to look through;
   a holographic layer disposed on the transparent carrier and sensitive to one or more certain wavelengths of light;
   a spatial amplitude modulator configured to output modulated light by modulating a source light according to input image data, the source light being at one or more of the one or more certain wavelengths; and
   a diffuser arranged to direct the modulated light onto the holographic layer, to thereby superimpose an image corresponding to the input image data onto a scene defined by a field of view of the user when looking through the transparent carrier;
   wherein the apparatus comprises a pair of glasses and wherein the transparent carrier comprises at least one lens of the pair of glasses, wherein the lenses may or may not be corrective lenses; and
   wherein the pair of glasses comprise left and right lenses having corresponding left and right side pieces for supporting the pair of glasses on a head of the user, and wherein the holographic layer is disposed on the front or rear surface of the left or right lens, the diffuser is disposed on an edge surface at a side of the same lens captured by the corresponding side piece, and the spatial amplitude modulator and a light source providing the source light are integrated with the corresponding side piece.
2. The apparatus of claim 1, wherein the holographic layer is both angle-selective and wavelength-selective, such that the holographic layer is responsive only to light incoming at angles corresponding to a relative positioning of the diffuser and only to light at the one or more certain wavelengths of the source light, and is otherwise transparent from the perspective of the user.

3. The apparatus of claim 1, wherein the holographic layer is disposed on a front or rear surface of the at least one lens, and wherein the diffuser is arranged on an edge surface of the at least one lens at a relative angle to the holographic layer and configured to redirect the modulated light according to the relative angle.

4. The apparatus of claim 3, wherein the lenses are corrective lenses and wherein the front or rear surface on which the holographic layer is disposed is curved for optical correction.

5. The apparatus of claim 1, wherein the at least one lens has a front surface facing the scene and a rear surface facing an eye of the user, when the user uses the pair of glasses to view the scene, and wherein the holographic layer is disposed on the front or rear surface of the at least one lens.

6. The apparatus as claimed in claim 1, wherein the diffuser is a holographic diffuser.

7. The apparatus as claimed in claim 1, wherein the diffuser has a dimension of less than 1.5 cm×1.5 cm.

8. The apparatus as claimed in claim 1, wherein the holographic layer is sensitive to multiple wavelengths, for superimposition of polychromatic images.

9. The apparatus of claim 8, wherein the holographic layer comprises multiple holographic layers, each layer sensitive to a respective one of the multiple wavelengths and transparent to other wavelengths.

10. An apparatus comprising:
a transparent carrier arranged for a user of the apparatus to look through;
a holographic layer disposed on the transparent carrier and sensitive to one or more certain wavelengths of light;
a spatial amplitude modulator configured to output modulated light by modulating a source light according to input image data, the source light being at one or more of the one or more certain wavelengths; and
a diffuser arranged to direct the modulated light onto the holographic layer, to thereby superimpose an image corresponding to the input image data onto a scene defined by a field of view of the user when looking through the transparent carrier;
wherein the input image data corresponds to first and second images to be superimposed by the holographic layer, wherein the modulated light comprises first modulated light at one or more certain frequencies and second modulated light at one or more other certain frequencies, the first and second modulated light corresponding to the first and second images, respectively, and wherein the holographic layer is configured with wavelength sensitivities such that it spatially positions the first image at a first position and the second image at a second position.

11. The apparatus as claimed in claim 10, wherein the first modulated light contains a first group of wavelengths corresponding to first wavelength sensitivities of the holographic layer, and wherein the second modulated light contains a second group of wavelengths corresponding to second wavelength sensitivities of the holographic layer.

12. The apparatus as claimed in claim 10, wherein the diffuser comprises a first diffuser at a first diffuser position and configured to direct the first modulated light onto the holographic layer, and a second diffuser at a second diffuser position and configured to direct the second modulated light onto the holographic layer.

13. An apparatus comprising:
a transparent carrier arranged for a user of the apparatus to look through;
a holographic layer disposed on the transparent carrier and sensitive to one or more certain wavelengths of light;
a spatial amplitude modulator configured to output modulated light by modulating a source light according to input image data, the source light being at one or more of the one or more certain wavelengths; and
a diffuser arranged to direct the modulated light onto the holographic layer, to thereby superimpose an image corresponding to the input image data onto a scene defined by a field of view of the user when looking through the transparent carrier;
wherein the transparent carrier is a lens or pane having a front surface facing the scene and a rear surface facing an eye of the user, when the user uses the lens or pane to view the scene, and wherein the holographic layer is disposed on the front or rear surface of the lens or pane; and
wherein the diffuser is a transmissive diffuser that transmissively redirects the modulated light onto the holographic layer and wherein the apparatus further includes an optical lens disposed between the spatial amplitude modulator and the transmissive diffuser, the optical lens arranged to focus the modulated light from the spatial amplitude modulator onto a light-receiving side of the transmissive diffuser.

* * * * *

UNITED STATES PATENT AND TRADEMARK OFFICE
CERTIFICATE OF CORRECTION

Page 1 of 1

PATENT NO. : 10,955,673 B2
APPLICATION NO. : 16/318519
DATED : March 23, 2021
INVENTOR(S) : C. Erler It is certified that error appears in the above-identified patent and that said Letters Patent is hereby corrected as shown below:

In the Specification

Column 1, Line 12, please change "by understood" to -- be understood --

Column 2, Line 14, please change "95 to" to -- 95° to --

Column 5, Line 46, please change "diffuser 25" to -- diffuser 26 --

Column 6, Line 3, please change "layer 26" to -- layer 27 --

Column 6, Line 63, please change "image 84" to -- image 82 --

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*